(12) United States Patent
Zhong et al.

(10) Patent No.: US 11,012,450 B2
(45) Date of Patent: May 18, 2021

(54) DETECTION DEVICE, DETECTION METHOD, DETECTION SYSTEM, AND DETECTION PROGRAM

(71) Applicant: NIPPON TELEGRAPH AND TELEPHONE CORPORATION, Chiyoda-ku (JP)

(72) Inventors: Yang Zhong, Musashino (JP); Masaki Tanikawa, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 253 days.

(21) Appl. No.: 16/302,742

(22) PCT Filed: May 25, 2017

(86) PCT No.: PCT/JP2017/019593
§ 371 (c)(1),
(2) Date: Nov. 19, 2018

(87) PCT Pub. No.: WO2017/208969
PCT Pub. Date: Dec. 7, 2017

(65) Prior Publication Data
US 2019/0222592 A1    Jul. 18, 2019

(30) Foreign Application Priority Data
Jun. 1, 2016 (JP) .............................. JP2016-110454

(51) Int. Cl.
*H04L 29/06* (2006.01)
*G06F 16/958* (2019.01)
(Continued)

(52) U.S. Cl.
CPC .......... *H04L 63/1416* (2013.01); *G06F 13/00* (2013.01); *G06F 16/953* (2019.01);
(Continued)

(58) Field of Classification Search
CPC ............. H04L 63/1416; H04L 63/0876; H04L 63/083; H04L 63/1441; G06F 16/958;
(Continued)

(56) References Cited

U.S. PATENT DOCUMENTS 9,514,294 B1 * 12/2016 Hepburn ............... H04L 9/3226
10,033,761 B2 * 7/2018 Akiyama ................ G06F 21/62
(Continued)

FOREIGN PATENT DOCUMENTS

JP    2008-503001 A    1/2008
JP    2017-76185 A    4/2017

OTHER PUBLICATIONS

International Search Report dated Aug. 1, 2017 in PCT/JP2017/019593, citing documents AA, AB, AO, AP, AV and AW therein, 2 pgages.

(Continued)

*Primary Examiner* — Sarah Su
(74) *Attorney, Agent, or Firm* — Oblon, McClelland, Maier & Neustadt, L.L.P.

(57) ABSTRACT

A device and method to accurately detect list-based attacks without reducing the convenience for authorized users. An acquirer acquires information on accounts used for log-in trials to a plurality of websites. An analyzer calculates the degree of use of each account used in common for log-in trials to different websites in a predetermined period of time out of the accounts acquired by the acquirer and determine the log-in trials using the account to be attacks when the degree of use exceeds a predetermined threshold. A detector detects, as an attack, a log-in trial to the website using the same account as the account used for the log-in trials determined to be attacks by the analyzer.

6 Claims, 7 Drawing Sheets

(51) Int. Cl.
*G06F 13/00* (2006.01)
*G06F 21/31* (2013.01)
*G06F 21/55* (2013.01)
*G06F 16/953* (2019.01)

(52) U.S. Cl.
CPC ............ *G06F 16/958* (2019.01); *G06F 21/31* (2013.01); *G06F 21/55* (2013.01); *H04L 63/0876* (2013.01); *H04L 63/083* (2013.01)

(58) Field of Classification Search
CPC ........ G06F 16/953; G06F 13/00; G06F 21/31; G06F 21/55
See application file for complete search history.

(56) References Cited

U.S. PATENT DOCUMENTS

| | | | |
|---|---|---|---|
| 2003/0149900 A1* | 8/2003 | Glassman | H04L 63/0807 726/6 |
| 2005/0278542 A1 | 12/2005 | Pierson et al. | |
| 2007/0258594 A1* | 11/2007 | Sandhu | H04L 9/3218 380/277 |
| 2015/0213251 A1* | 7/2015 | Turgeman | G06F 21/32 726/7 |
| 2016/0224790 A1* | 8/2016 | Gupta | G06F 21/566 |
| 2017/0048260 A1* | 2/2017 | Peddemors | H04L 63/0876 |
| 2017/0093873 A1* | 3/2017 | Beaulieu | H04L 63/18 |
| 2017/0104771 A1 | 4/2017 | Saito et al. | |
| 2017/0308688 A1* | 10/2017 | Orihara | G06F 21/316 |
| 2018/0007087 A1* | 1/2018 | Grady | H04L 63/101 |
| 2018/0176250 A1* | 6/2018 | Zhong | H04L 63/08 |
| 2019/0052672 A1* | 2/2019 | Kumar | H04L 63/1425 |
| 2019/0098037 A1* | 3/2019 | Shenoy, Jr. | H04L 63/105 |
| 2020/0213334 A1* | 7/2020 | Kutner | H04L 63/083 |

OTHER PUBLICATIONS

International Search Report dated Aug. 1, 2017 in PCT/JP2017/019593, 2 pages.

Satomi Saito, et al., "Observing STBF (Brute Force Attack with Single Trials) by SSH Login Sensors" Computer Security Symposium 2015, Oct. 14, 2015, pp. 1088-1095 (with English translation of the relevant part).

Yuji Furuta, et al., "Privacy-Preserving Log Analysis with Deterministic Encryption" Technical Report of IEICE, vol. 115, No. 488, Feb. 25, 2016, pp. 41-46 (with English translation of the relevant part).

"Countermeasures against Unauthorized Logins Caused by List-type Account Hacking (Collection of Countermeasures for Internet Service Providers, including Site Administrators)" Ministry of Internal Affairs and Communications, Dec. 2013, Retrieval Date: Apr. 27, 2016, the Internet <URL:http://www.soumu.go.jp/main_content/000265403.pdf>, pp. 1 - 17 (Cover letter and English translation of the relevant part).

"Fact-Finding Report on Online User Authentication Scheme" IPA, Information-technology Promotion Agency, Japan, Aug. 2014, Retrieval Date: Apr. 27, 2016, the Internet <URL: https://www.ipa.go.jp/files/000040778.pdf>, pp. 1-118 (English translation of the relevant part).

* cited by examiner

| TIME | ACCOUNT NAME | WEBSITE NAME |
|---|---|---|
| 2015/1/1 00:00:00 | user1 | A.com |
| 2015/1/2 02:00:00 | user1 | B.com |
| 2015/1/3 03:00:00 | user1 | C.com |
| 2015/1/3 03:01:00 | user2 | A.com |
| 2015/1/3 03:02:00 | user3 | A.com |
| ... | ... | ... |

| ACCOUNT NAME | LAST ANALYSIS TIME | PERIOD OF TIME (D) | SCORE (S) | ATTACK DETERMINATION |
|---|---|---|---|---|
| user1 | 2015/1/4 00:00:00 | 1week | 0.75 | Yes |
| user2 | 2015/1/4 00:00:00 | 1week | 0.25 | No |
| user3 | 2015/1/4 00:00:00 | 1week | 0.25 | No |
| ... | ... | ... | ... | ... |

FIG.5

LOG-IN HISTORY OF WEBSITE A

| TIME | ACCOUNT NAME | IP ADDRESS | | LOG-IN RESULT |
|---|---|---|---|---|
| 2015/1/1 00:00:00 | user101 | ip1 | | SUCCESS |
| 2015/1/1 00:00:00 | user102 | ip2 | | SUCCESS |
| 2015/1/1 00:00:00 | user103 | ip3 | | SUCCESS |
| 2015/1/1 00:00:00 | user1 | ip4 | | FAILED |
| 2015/1/3 03:01:00 | user2 | ip5 | PERIOD OF TIME D2 | FAILED |
| 2015/1/3 03:02:00 | user3 | ip6 | | FAILED |
| 2015/1/3 04:00:00 | user4 | ip4 | | SUCCESS |

ADD

14a

| TIME | ACCOUNT NAME | WEBSITE NAME |
|---|---|---|
| 2015/1/1 00:00:00 | user1 | A.com |
| 2015/1/2 02:00:00 | user1 | B.com |
| 2015/1/3 03:00:00 | user1 | C.com |
| 2015/1/3 03:01:00 | user2 | A.com |
| 2015/1/3 03:02:00 | user3 | A.com |
| 2015/1/3 04:00:00 | user4 | A.com |

14b

| ACCOUNT NAME | LAST ANALYSIS TIME | PERIOD OF TIME (D) | SCORE (S) | ATTACK DETERMINATION |
|---|---|---|---|---|
| user1 | 2015/1/4 00:00:00 | 1week | 0.75 | Yes |
| user2 | 2015/1/4 00:00:00 | 1week | 0.25 | No |
| user3 | 2015/1/4 00:00:00 | 1week | 0.25 | No |
| user4 | 2015/1/4 00:00:00 | 1week | 0.75 | Yes |

FIG.6

| ACCOUNT NAME | LAST ANALYSIS TIME | PERIOD OF TIME (D) | SCORE (S) | WEIGHT (W) | ATTACK DETERMINATION |
|---|---|---|---|---|---|
| user1 | 2015/1/4 00:00:00 | 1week | 0.75 | 1.0 | Yes |
| user2 | 2015/1/4 00:00:00 | 1week | 0.25 | 4.0 | Yes |
| user3 | 2015/1/4 00:00:00 | 1week | 0.25 | 1.0 | No |
| ... | ... | ... | ... | ... | ... |

FIG.7

| TIME | ACCOUNT NAME | DETECTION RESULT |
|---|---|---|
| 2015/1/5 00:00:00 | user11 | Normal |
| 2015/1/5 00:01:00 | user12 | Normal |
| 2015/1/5 00:02:00 | user13 | Normal |
| 2015/1/5 00:03:00 | user1 | Attack |
| 2015/1/5 00:04:00 | user4 | Attack |

DETECTION DEVICE, DETECTION METHOD, DETECTION SYSTEM, AND DETECTION PROGRAM

FIELD

The present invention relates to a detection device, a detection method, a detection system, and a detection program.

BACKGROUND

Account authentication using account names and passwords are widely performed for services on the Internet. In other words, services are provided to users authenticated using account names and passwords registered in advance.

Many of the users each register and use the same account name and password for a plurality of services. With the circumstances described above, what is called list-based attacks have recently occurred frequently. The list-based attacks mean that an attacker who has unauthorizedly obtained a list of registered account names and passwords repeats log-in trials using the list to unauthorizedly log in to various other sites.

Conventionally known are methods for detecting such list-based attacks as attacks when the number of authentication failures in a certain period of time exceeds a fixed value (refer to Non Patent Literature 1). Also widely known are methods for detecting attacks by making a comparison with the characteristics of terminals that have succeeded in log-in before (refer to Non Patent Literature 2).

CITATION LIST

Non Patent Literature

Non Patent Literature 1: "Measures against Unauthorized Log-in by List-based Account Hacking," [online], December 2013, Ministry of Internal Affairs and Communications, [searched on Apr. 27, 2016], the Internet <URL: http://www.soumu.go.jp/main_content/000265403.pdf>

Non Patent Literature 2: "A Report on a Fact-finding Survey on Online Personal Authentication Systems," [online], August 2014, IPA, [searched on Apr. 27, 2016], the Internet <URL: https://www.ipa.go.jp/files/000040778.pdf>

SUMMARY

Technical Problem

The conventional techniques, however, fail to detect log-in trials carried out by an attacker as attacks based on the number of authentication failures in a certain period of time if the attacker carries out the login-trials from a plurality of different IP addresses or with less frequency. The methods of making a comparison with the characteristics of terminals that have succeeded in log-in before may possibly erroneously detect a log-in trial carried out by an authorized user as an attack when the authorized user carries out the log-in trial from a different terminal or a different environment. As described above, the conventional techniques reduce the convenience for users.

In view of the disadvantages described above, the present invention aims to accurately detect list-based attacks without reducing the convenience for authorized users.

Solution to Problem

A detection device including: an acquirer configured to acquire information on accounts used for log-in trials to a plurality of sites; an analyzer configured to calculate a degree of use of an account used in common for log-in trials to different sites in a predetermined period of time out of the accounts acquired by the acquirer and determine the log-in trials using the account to be attacks when the degree of use exceeds a predetermined threshold; and a detector configured to detect, as an attack, a log-in trial to a site using the same account as the account used for the log-in trials determined to be attacks by the analyzer.

Advantageous Effects of Invention

The present invention can accurately detect list-based attacks without reducing the convenience for authorized users.

BRIEF DESCRIPTION OF DRAWINGS

FIG. 3 is a diagram of a data structure of account information.

FIG. 4 is a diagram of a data structure of account analysis information.

FIG. 5 is a diagram for explaining processing performed by an analyzer.

FIG. 6 is a diagram of another example of data structure of the account analysis information.

FIG. 7 is a diagram of detection results.

DESCRIPTION OF EMBODIMENTS

Figure 1:
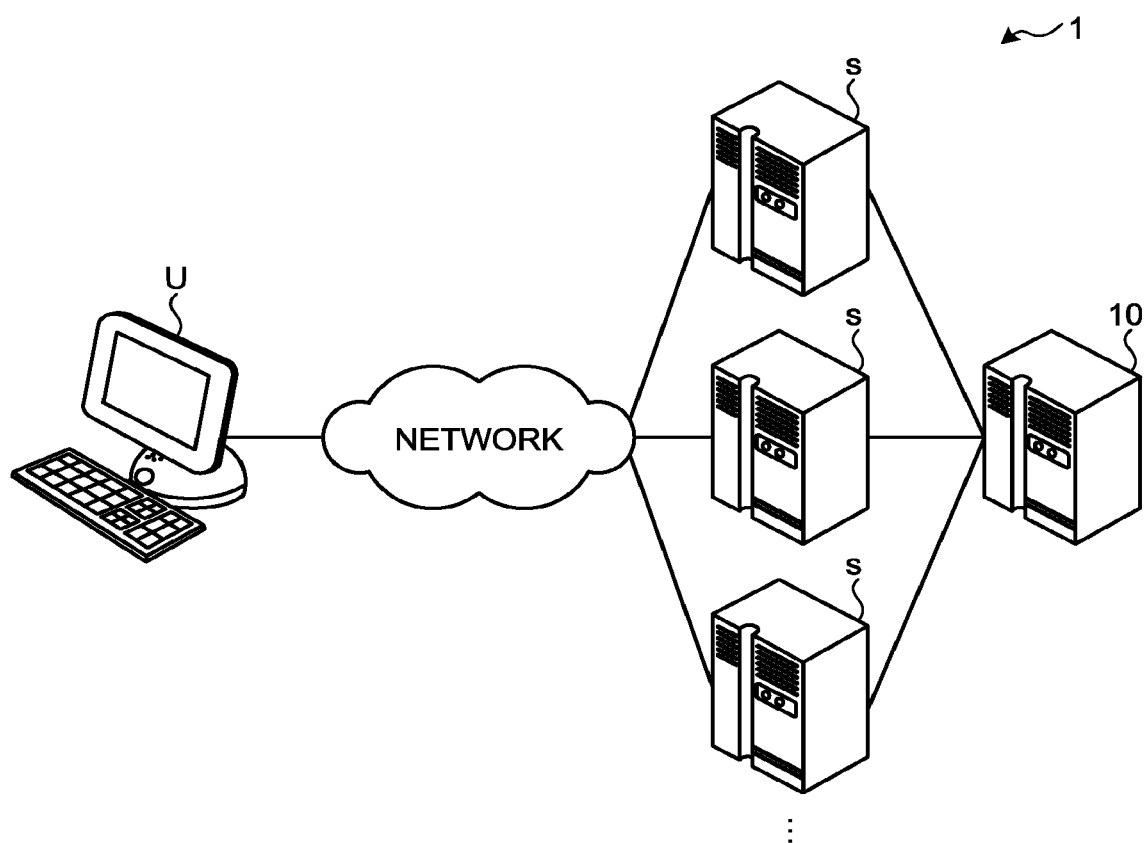
FIG. 1 is a schematic of an outline configuration of a detection system serving as an object of a detection device according to an embodiment of the present invention.

An embodiment of the present invention is described below in greater detail with reference to the accompanying drawings. The embodiment is not intended to limit the present invention. In the drawings, like components are denoted by like reference numerals.

Configuration of the Detection System

FIG. 1 is a diagram of an outline configuration of a detection system 1 including a detection device 10 according to the present embodiment. As illustrated in FIG. 1, the system serving as an object of detection performed by the detection device 10 includes a terminal U used by a user and a plurality of web servers s. The terminal U and the web servers s are coupled to a network, such as the Internet. One or a plurality of websites are constructed on each of the web servers s.

The terminal U carries out log-in trials to the websites using accounts. The web servers s are provided as general-purpose computers, such as workstations, and execute applications corresponding to the respective websites. The websites each perform authentication of the account used for the log-in trial carried out by the terminal U. If the authentication succeeds, the websites each permit log-in to the application with the account.

The detection device 10 according to the present embodiment is coupled to the websites via a telecommunication line, such as a LAN (local area network) and the Internet. The detection device 10 performs detection, which will be described later. The detection device 10 refers to a log-in history indicating history information on log-in trials in the websites and detects, as attacks, log-in trials to a number of websites 20 using a common account in a certain period of time.

Configuration of the Detection Device

Figure 2:
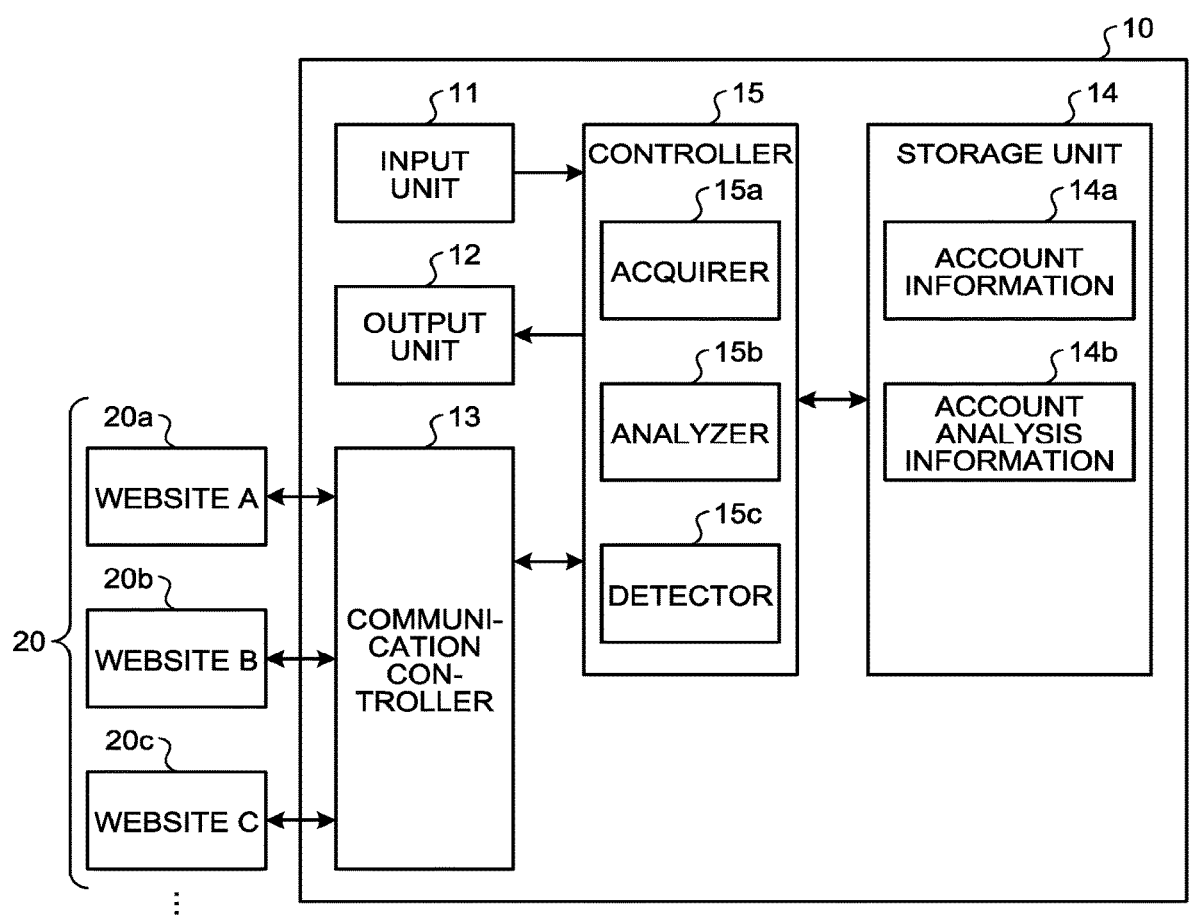
FIG. 2 is a schematic of an outline configuration of the detection device according to the present embodiment.

FIG. 2 is a schematic of an outline configuration of the detection device according to the present embodiment. As illustrated in FIG. 2, the detection device 10 is provided as a general-purpose commuter, such as a workstation and a personal computer. The detection device 10 includes an input unit 11, an output unit 12, a communication controller 13, a storage unit 14, and a controller 15.

The input unit 11 is provided as an input device, such as a keyboard and a mouse. The input unit 11 inputs various kinds of instruction information, such as start of processing, to the controller 15 in response to an input operation performed by an operator. The output unit 12 is provided as a display device, such as a liquid crystal display, a printing device, such as a printer, an information communication device, or the like.

The communication controller 13 is provided as an NIC (network interface card), for example. The communication controller 13 controls communications between external devices, such as the web servers s, and the controller 15 via the telecommunication line, such as a LAN and the Internet.

The storage unit 14 is provided as a semiconductor memory device, such as a RAM (random access memory) and a flash memory, or a storage device, such as a hard disk and an optical disc. The storage unit 14 may communicate with the controller 15 via the communication controller 13. The storage unit 14 stores therein account information 14a and account analysis information 14b. The account information 14a and the account analysis information 14b are generated in detection, which will be described later, and stored in the storage unit 14.

FIG. 3 is a diagram of a data structure of the account information 14a. As illustrated in FIG. 3, the account information 14a includes time, an account name, and a website name.

The account information 14a is generated in processing performed by an acquirer 15a, which will be described later. The time indicates time of a log-in trial to a website 20 using a corresponding account. The account name indicates a name for identifying the account used for the log-in trial. The website name indicates a name for identifying the website 20 serving as an object of the log-in trial. FIG. 3 (fifth row) indicates that a log-in trial to a website "A.com" using an account "user3" is carried out at 03:02:00 on Jan. 3, 2015, for example.

FIG. 4 is a diagram of a data structure of the account analysis information 14b. As illustrated in FIG. 4, the account analysis information 14b includes an account name, last analysis time, a period of time (D), a score (S), and attack determination.

The account analysis information 14b is generated in processing performed by an analyzer 15b, which will be described later. The last analysis time indicates time of the latest processing performed by the analyzer 15b. The period of time (D) indicates a predetermined period of time for the processing performed by the analyzer 15b, which will be described later. The score (S) indicates the degree of use of an account corresponding to the account name, that is, the co-occurrence of the account, which will be described later. The attack determination indicates whether a log-in trial using the account is determined to be an attack by the analyzer 15b, which will be described later. FIG. 4 (first row) indicates the analysis result that the analyzer 15b calculates the score S of the account "user1" in one week to be 0.75 and determines the log-in trial using the account to be an attack (attack determination=Yes) at 00:00:00 on Jan. 4, 2015, for example.

Referring back to FIG. 2, the controller 15 is provided as a CPU (central processing unit) or the like and executes a processing program stored in a memory. As a result, the controller 15 serves as the acquirer 15a, the analyzer 15b, and a detector 15c as illustrated in FIG. 2 and performs detection, which will be described later.

The acquirer 15a acquires information on accounts used for log-in trials to a plurality of websites 20 (a website A 20a, a website B 20b, a website C 20c, . . . ). Specifically, the acquirer 15a refers to history information on the log-in trials to the websites 20 and extracts information on accounts used for suspicious log-in trials to generate the account information 14a. In other words, the acquirer 15a refers to the log-in history of the websites 20 and extracts the time, the account name, and the website name on the accounts used for the suspicious log-in trials to generate the account information 14a. The acquirer 15a stores the account information 14a in the storage unit 14.

The suspicious log-in trials include a log-in trial to an account not registered in the website 20, for example. The suspicious log-in trials also include log-in trials and authentication failures to a large number of accounts from a certain IP address. The suspicious log-in trials also include a case where there are log-in trials and authentication failures to a small number of accounts from a certain IP address but there is neither log-in trial nor authentication success to the accounts after a predetermined time has elapsed. In addition, the suspicious log-in trials include a log-in trial determined to be suspicious by a website manager, for example.

The analyzer 15b calculates the degree of use of each account used in common for log-in trials to different websites 20 in a predetermined period of time out of the accounts acquired by the acquirer 15a. If the degree of use exceeds a predetermined threshold, the analyzer 15b determines the log-in trials using the account to be attacks.

Specifically, the analyzer 15b calculates the co-occurrence of each account in the account information 14a indicating the degree of being used in common for the log-in trials to a plurality of websites 20 in the predetermined period of time D.

The co-occurrence of each account is calculated as the ratio of the number N of websites subjected to log-in trials using the account to the number M (M>1) of all the sites on the websites 20 on which the account information is acquired by the acquirer 15a, for example. In other words, the score S indicating the co-occurrence is calculated by Expression (1):

$$S=N/M \tag{1}$$

If the calculated score S exceeds a predetermined threshold T, the analyzer 15b determines the log-in trial using the account to be an attack (attack determination=Yes). If the score S does not exceed the threshold T, the analyzer 15b determines that the log-in trial using the account is authorized and is not an attack (attack determination=No). Subsequently, the analyzer 15b acquires information on the account name, the last analysis time, the period of time (D), the score (S), and the attack determination of the account to generate the account analysis information 14b. The analyzer 15b stores the account analysis information 14b in the storage unit 14.

In the account analysis information 14b illustrated in FIG. 4, the predetermined period of time D for calculation of the score S is one week, the threshold T of the score S for attack determination is 0.5, and the number M of all the sites is four. The account "user1", for example, carries out log-in trials on three sites of "A.com", "B.com", and "C.com" (N=3). As a result, the score S of the account "user1" is calculated to be 0.75, and the log-in trials are determined to be attacks.

The analyzer 15b also calculates the score S indicating the co-occurrence of other accounts used for log-in trials carried out in a predetermined period of time from the terminal U that has carried out the log-in trials determined to be attacks.

The following specifically describes the processing with reference to FIG. 5. As illustrated in FIG. 5, for example, the analyzer 15b refers to the log-in history of the website A to identify an IP address "ip4" of the terminal U that has carried out the log-in trials determined to be attacks using the account "user1".

The analyzer 15b extracts an account "user4" other than the account "user1" used for a log-in trial carried out from the IP address "ip4" in a predetermined period of time D2 and adds the account "user4" to the account information 14a. Also in this case, similarly to the processing described above, the analyzer 15b calculates the score S indicating the co-occurrence of the account "user4" and adds the score S to the account analysis information 14b. Consequently, the analyzer 15b can efficiently collect the information on suspicious accounts and reduce the possibility of overlooking attacks.

The terminal U that has carried out the log-in trials determined to be attacks before is not necessarily identified by an IP address and may be identified by a UA (user agent), for example.

Furthermore, the acquirer 15a may acquire information on an account having high probability of being used for an attack, and the analyzer 15b may perform predetermined weighting on the calculated score S of the account. Specifically, the acquirer 15a acquires information on a leak account indicating an account having high probability of being used for an attack and adds the information to the account information 14a.

The information on a leak account is acquired by monitoring leaked accounts, for example. Some attackers post information on an account of an authorized user acquired in attacks or the like on message posting sites, such as Pastebin and Gist. By monitoring such posting sites and other sites, the acquirer 15a can acquire the information on leaked accounts (reference literature: japan.cnet.com/news/service/35016862/.

To monitor the posting sites, the acquirer 15a crawls the target posting sites regularly and checks whether there are a large number of hash values of e-mail addresses and passwords assumed to be user accounts (reference literature: raidersec.blogspot.jp12013/03/introducing-dumpmon-twitter-bot-that. html Alternatively, the acquirer 15a acquires the information on a leak account by monitoring behavior of a user on open SNS sites, such as Twitter, from the outside. If an account is leaked and the behavior of the user significantly changes, the acquirer 15a acquires the information on the account. Whether an account is leaked can be detected based on the interval of messages, the language, and URL included in the messages, for example (reference literature: COMPA: Detecting Compromised Accounts on Social Networks, www.internetsociety.org/doc/compa-detecting-compromised-accounts-social-networks.

If the information on a leak account is added to the account information 14a, the analyzer 15b calculates the score S indicating the co-occurrence of the added leak account and adds the score S to the account analysis information 14b similarly to the processing described above. The leak account is a leaked account and has characteristics of being likely to be used for an attack. The analyzer 15b performs weighting on the calculated score S with a predetermined weight W.

In this case, the item of the weight W for the scores S of the respective accounts are added to the account analysis information 14b. If the weight W×the score S exceeds the threshold T for attack determination, the analyzer 15b determines the log-in trial using the account to be an attack (attack determination=Yes). If the weight W×the score S does not exceed the threshold T, the analyzer 15b determines that the log-in trial using the account is authorized and is not an attack (attack determination=No). With this mechanism, the log-in trial can be determined to be an attack if the co-occurrence of the account is lower in an early stage of the attack.

FIG. 6 is a diagram of the account analysis information 14b generated when the information on a leak account is added to the account information 14a. In the example illustrated in FIG. 6, a leak account "user2" is added. The weight W for the leak account is set to 4.0, and the weight W for the other accounts is set to 1.0. The score S of the leak account "user2" is 0.25 and smaller than a threshold T of 0.5. The weight W×the score S, however, exceeds the threshold T as a result of weighting with a weight W of 4. Consequently, the log-in trial using the account is determined to be an attack.

Referring back to FIG. 2, the detector 15c detects, as an attack, a log-in trial to the website 20 using the same account as the account used for the log-in trials determined to be attacks by the analyzer 15b. Specifically, the detector 15c refers to the log-in history of the websites 20 serving as objects of detection and determines a log-in trial using the account determined to be an attack (attack determination=Yes) in the account analysis information 14b. The detector 15c outputs the detection result to the output unit 12.

FIG. 7 is a diagram of the results of detection performed by the detector 15c. The detector 15c refers to the account analysis information 14b to identify an account determined to be an attack (attack determination=Yes). The detector 15c, for example, refers to the account analysis information 14b illustrated in FIG. 5 to identify the account "user1" and the account "user4". As illustrated in FIG. 7, the detector 15c detects log-in trials using the account "user1" and the account "user4" as attacks in the log-in history of the websites 20 serving as objects of detection. In the example illustrated in FIG. 7, "Attack" indicates the detection result that the login-trial is determined to be an attack, and "Normal" indicates the detection result that the login-trial is not determined to be an attack.

Detection

Figure 8:
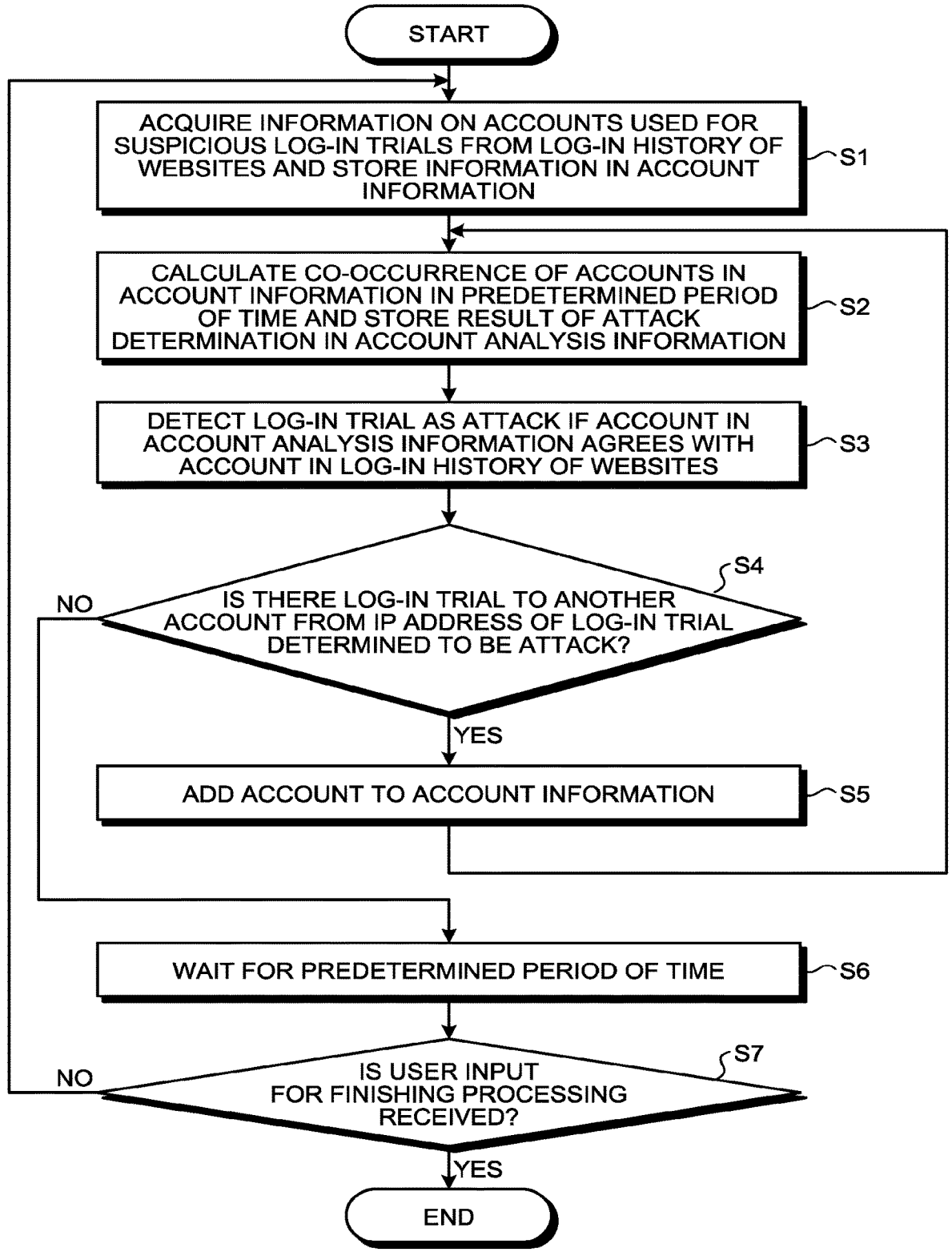
FIG. 8 is a flowchart of a detection procedure according to the present embodiment.

The following describes the detection performed by the detection device 10 according to the present embodiment with reference to FIG. 8. FIG. 8 is a flowchart of a detection procedure. The flowchart illustrated in FIG. 8 starts at a timing when an operating input for giving instructions to start the processing, for example.

The acquirer 15a refers to the log-in history of the websites 20, acquires the information on accounts used for suspicious log-in trials to generate the account information 14a, and stores the account information 14a in the storage unit 14 (Step S1).

The analyzer 15b calculates the co-occurrence indicating the degree of being used in common for different websites 20 of the accounts in the account information 14a acquired in the predetermined period of time D, determines whether the log-in trials are attacks, and stores the results of attack determination in the account analysis information 14b (Step S2).

The detector 15c compares the accounts determined to be attacks in the account analysis information 14b with the log-in history of the websites 20 and detects, as an attack, the log-in trial using the account agreeing with the accounts determined to be attacks (Step S3).

The analyzer 15b refers to the log-in history of the websites 20 to identify the IP address or UA of the terminal that has carried out the log-in trials determined to be attacks. The analyzer 15b then determines whether there is a log-in trial using another yet-to-be-detected account from the identified IP address or UA in the predetermined period of time D2 (Step S4).

If there is a log-in trial using another yet-to-be-detected account from the identified IP address or UA (Yes at Step S4), the analyzer 15b adds the account used for the log-in trial to the account information 14a (Step S5), and the process is returned to Step S2.

By contrast, if there is no log-in trial using another yet-to-be-detected account from the identified IP address or UA (No at Step S4), the analyzer 15b waits for a predetermined period of time (Step S6). If there is no user input for giving instructions to finish the processing (No at Step S7), the process is returned to Step S1. If there is a user input for giving instructions to finish the processing (Yes at Step S7), the analyzer 15b finishes the serial detection.

As described above, in the detection device 10 according to the present embodiment, the acquirer 15a acquires the information on accounts used for log-in trials to a plurality of websites 20. The analyzer 15b calculates the co-occurrence indicating the degree of use of each account used in common for log-in trials to different websites 20 in a predetermined period of time out of the accounts acquired by the acquirer 15a. If the co-occurrence exceeds a predetermined threshold, the analyzer 15b determines the log-in trials using the account to be attacks. The detector 15c detects, as an attack, a log-in trial to the website 20 using the same account as the account used for the log-in trials determined to be attacks by the analyzer 15b.

The analyzer 15b, for example, calculates the co-occurrence of each account as the ratio of the number N of websites subjected to the log-in trials using the account to the number M of all the sites on the websites 20 on which the account information is acquired by the acquirer 15a.

The detection device 10 focuses not on the frequency of the log-in trials but on the account used for the log-in trials. Consequently, the detection device 10 can effectively detect list-based attacks if an attacker carries out the login-trials from a plurality of different IP addresses or with less frequency. Furthermore, the detection device 10 can avoid erroneously detecting a log-in trial carried out by an authorized user as an attack when the authorized user carries out the log-in trial from a different terminal or a different environment. As described above, the detection device 10 can accurately detect list-based attacks without reducing the convenience for authorized users.

The analyzer 15b of the detection device 10 calculates the co-occurrence of the other accounts used for log-in trials carried out in a predetermined period of time from the terminal U that has carried out the log-in trials determined to be attacks. Consequently, the detection device 10 can efficiently collect the information on suspicious accounts and reduce the possibility of overlooking attacks.

The acquirer 15a acquires the information on an account having high probability of being used for an attack, and the analyzer 15b performs predetermined weighting on the calculated score S of the account. Consequently, the detection device 10 can detect list-based attacks if the co-occurrence of the account is lower in an early stage of the attack.

The detector 15c may notify the web servers s corresponding to the websites 20 of the account used for the log-in trials detected as attacks. In this case, the web servers s may include a protector that protects them from the received account used for the log-in trials. The protector, for example, may temporarily lock the account used for the log-in trials detected as attacks. Alternatively, the protector may perform additional authentication, such as two-step authentication, on the account.

Programs

A program describing the processing performed by the detection device 10 according to the embodiment above in a computer-executable language can be created. The detection device 10 according to an embodiment can be provided by installing, in a desired computer, a detection program that performs the detection described above as packaged or online software. An information processing device executes the detection program, for example, thereby serving as the detection device 10. Examples of the information processing device may include, but are not limited to, desktop or notebook personal computers, etc. Examples of the information processing device may also include, but are not limited to, mobile communication terminals, such as smartphones, mobile phones, and PHS (personal handy-phone system), slate terminals, such as PDA (personal digital assistants), etc. A terminal device used by a user may be defined as a client, and the detection device 10 may be provided as a server device that provides services relating to the detection to the client. The detection device 10, for example, is provided as a server device that provides detection services of receiving the log-in history of websites and outputting the detection results. In this case, the detection device 10 may be provided as a web server or a cloud that provides services relating to the detection by outsourcing. The following describes an example of a computer that executes the detection program for implementing the same functions as those of the detection device 10.

Figure 9:
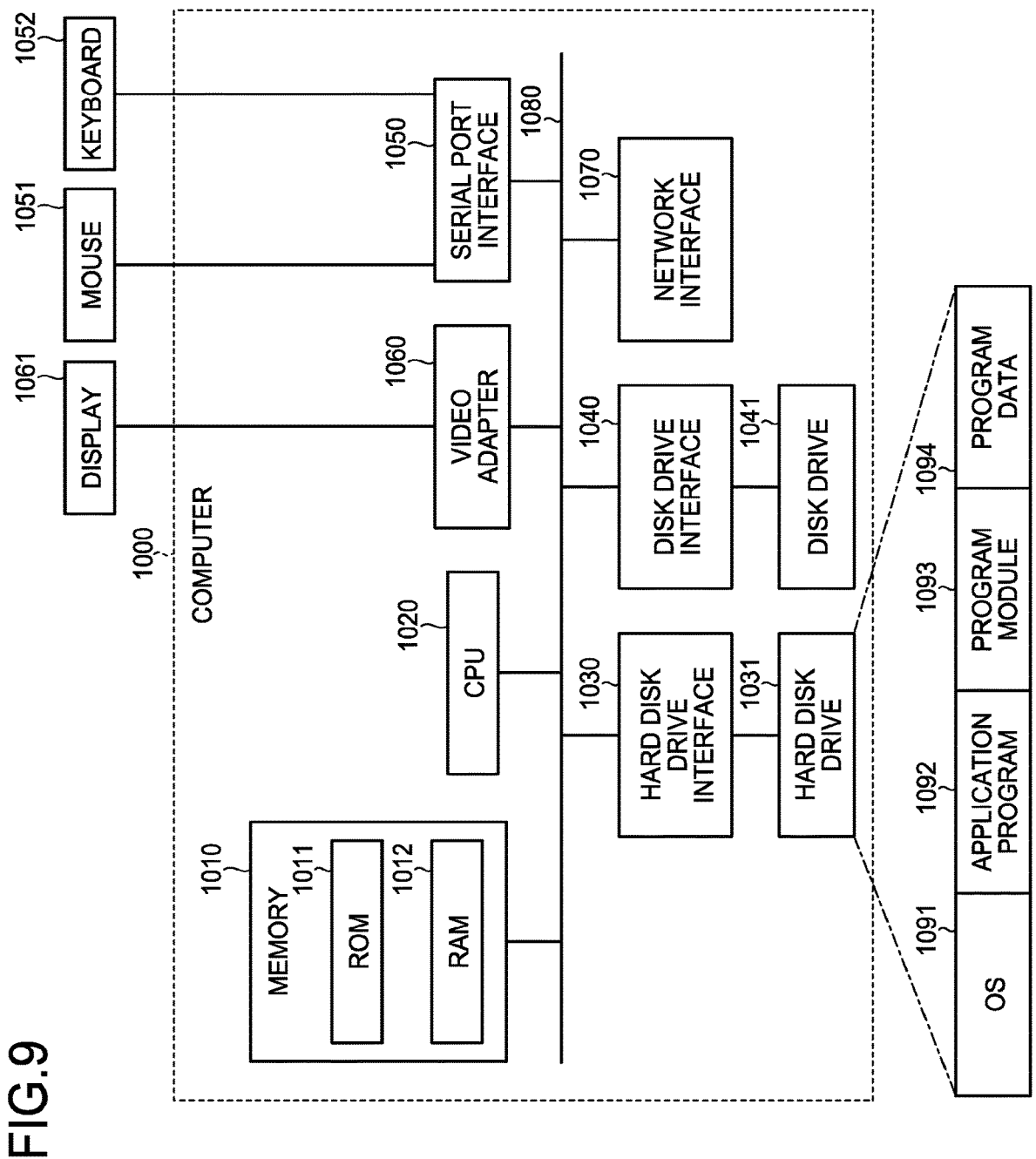
FIG. 9 is a diagram of a computer that executes a detection program.

As illustrated in FIG. 9, a computer 1000 that executes the detection program includes a memory 1010, a CPU 1020, a hard disk drive interface 1030, a disk drive interface 1040, a serial port interface 1050, a video adapter 1060, and a network interface 1070, for example. These components are coupled via a bus 1080.

The memory 1010 includes a ROM (read only memory) 1011 and a RAM 1012. The ROM 1011 stores therein a boot program, such as a BIOS (basic input/output system). The hard disk drive interface 1030 is coupled to a hard disk drive 1031. The disk drive interface 1040 is coupled to a disk drive 1041. Detachable storage media, such as magnetic disks and optical discs, are inserted into the disk drive 1041. The serial port interface 1050 is coupled to a mouse 1051 and a keyboard 1052, for example. The video adapter 1060 is coupled to a display 1061, for example.

As illustrated in FIG. 9, the hard disk drive 1031 stores therein an OS 1091, an application program 1092, a program module 1093, and program data 1094, for example. The tables described in the embodiment above are stored in the hard disk drive 1031 and the memory 1010, for example.

The detection program is stored in the hard disk drive 1031 as the program module 1093 describing commands executed by the computer 1000, for example. Specifically, the program module 1093 describing the processing performed by the detection device described in the embodiment above is stored in the hard disk drive 1031.

The data used for information processing by the detection program is stored in the hard disk drive 1031 as the program data 1094, for example. The CPU 1020 reads the program module 1093 and the program data 1094 stored in the hard disk drive 1031 to the RAM 1012 as needed and performs the procedures described above.

The program module 1093 and the program data 1094 according to the detection program are not necessarily stored in the hard disk drive 1031. The program module 1093 and the program data 1094 may be stored in a detachable storage medium and read by the CPU 1020 via the disk drive 1041, for example. Alternatively, the program module 1093 and the program data 1094 according to the detection program may be stored in another computer coupled via a network, such as a LAN and a WAN (wide area network), and read by the CPU 1020 via the network interface 1070.

While an exemplary embodiment according to the invention made by the present inventor has been described, the description and the drawings according to the present embodiment serving as part of the disclosure of the present invention are not intended to limit the invention. In other words, all of the other embodiments, practical examples, and implementation techniques conceivable by those skilled in the art based on the present embodiment, for example, fall within the scope of the present invention.

REFERENCE SIGNS LIST 1 detection system
10 detection device
11 input unit
12 output unit
13 communication controller
14 storage unit
14a account information
14b account analysis information
15 controller
15a acquirer
15b analyzer
15c detector
20 website
S web server
U terminal

The invention claimed is:

1. A detection device comprising:
processing circuitry configured to
acquire information on accounts used for log-in trials to a plurality of sites;
calculate a degree of use of an account used in common for log-in trials to different sites in a predetermined period of time out of the accounts for which the information was acquired and determine the log-in trials using the account to be attacks when the degree of use exceeds a predetermined threshold; and
detect, as an attack, a log-in trial to a site using the same account as the account used for the log-in trials determined to be attacks,
wherein the processing circuitry calculates the degree of use of the account as a ratio of number of sites subjected to the log-in trials using the account to number of all the sites on which the account information is acquired.

2. A detection device comprising:
processing circuitry configured to
acquire information on accounts used for log-in trials to a plurality of sites;
calculate a degree of use of an account used in common for log-in trials to different sites in a predetermined period of time out of the accounts for which the information was acquired and determine the log-in trials using the account to be attacks when the degree of use exceeds a predetermined threshold; and
detect, as an attack, a log-in trial to a site using the same account as the account used for the log-in trials determined to be attacks,
wherein the processing circuitry calculates a degree of use of other accounts used for log-in trials carried out in the predetermined period of time from a terminal that has carried out the log-in trials determined to be attacks.

3. The detection device according to claim 1, wherein the processing circuitry acquires information on an account having high probability of being used for an attack based on receiving an indication that the account has been leaked, and performs predetermined weighting on the calculated degree of use of the account.

4. A detection method performed by a detection device, the detection method comprising:
acquiring information on accounts used for log-in trials to a plurality of sites;
analyzing by calculating a degree of use of an account used in common for log-in trials to different sites in a predetermined period of time out of the accounts acquired in the step of acquiring and determining the log-in trials using the account to be attacks when the degree of use exceeds a predetermined threshold; and
detecting, as an attack, a log-in trial to a site using the same account as the account used for the log-in trials determined to be attacks in the analyzing,
wherein the degree of use of the account is calculated as a ratio of number of sites subjected to the log-in trials using the account to number of all the sites on which the account information is acquired.

5. A detection system comprising a terminal used by a user, a plurality of servers, and a detection device, sites constructed on the servers performing authentication of accounts used for log-in trials carried out by the terminal and permitting log-in with the accounts when the authentication succeeds, wherein
the detection device comprises processing circuitry configured to:
acquire information on the accounts used for the log-in trials to the sites;
calculate a degree of use of an account used in common for log-in trials to different sites in a predetermined period of time out of the accounts for which the information was acquired and determine the log-in trials using the account to be attacks when the degree of use exceeds a predetermined threshold; and
detect, as an attack, a log-in trial to a site using the same account as the account used for the log-in trials determined to be attacks and notify the server corresponding to the site of the account, and the server comprises processing circuitry configured to protect the server from the received account used for the log-in trial, wherein the processing circuitry of the detection device calculates the degree of use of the account as a ratio of number of sites subjected to the log-in trials using the account to number of all the sites on which the account information is acquired.

6. A non-transitory computer readable medium that stores a detection program causing a computer to perform:

acquiring information on accounts used for log-in trials to a plurality of sites;

analyzing by calculating a degree of use of an account used in common for log-in trials to different sites in a predetermined period of time out of the accounts acquired in the acquiring and determining the log-in trials using the account to be attacks when the degree of use exceeds a predetermined threshold; and detecting, as an attack, a log-in trial to a site using the same account as the account used for the log-in trials determined to be attacks in the analyzing, wherein the degree of use of the account is calculated as a ratio of number of sites subjected to the log-in trials using the account to number of all the sites on which the account information is acquired.

\* \* \* \* \*